Oct. 25, 1949.     B. A. MAIN, JR     2,485,975
HOSE END FITTING
Filed April 15, 1947
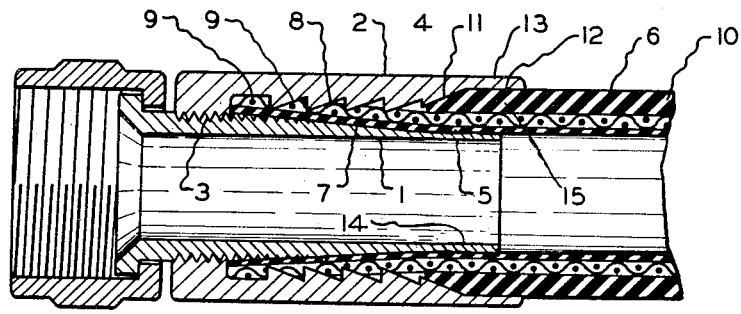
FIG. I.
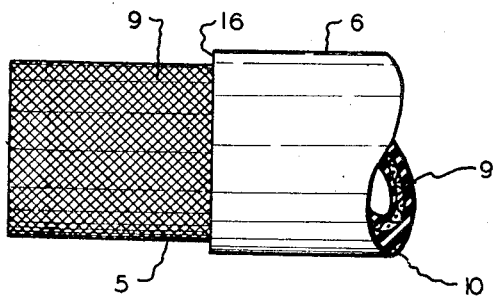
FIG. II.
Inventor
BENJAMIN A. MAIN JR.
By Beaman & Patch
Attorneys Patented Oct. 25, 1949

2,485,975

UNITED STATES PATENT OFFICE 2,485,975

HOSE END FITTING

Benjamin A. Main, Jr., Jackson, Mich., assignor to Aeroquip Corporation, Jackson, Mich., a corporation of Michigan Application April 15, 1947, Serial No. 741,600

1 Claim. (Cl. 285—84)

This invention relates to hose end fittings of the kind which are employed on the ends of flexible hoses to enable the latter to be readily coupled to a desired location and which consists of an outer socket and an inner concentric nipple connected with each other at one end by screw-threading and providing between them an annular space in which the corresponding end portion of the flexible hose is secured, so as to fill the said space, by longitudinal extrusion or displacement of the material of the hose as the latter, having the socket initially secured about the outer surface of the hose, is rotated relatively to the nipple in order to secure the latter in position on the inside of the hose. The socket, on its interior surface, is screw-threaded in the opposite direction to the direction of the screw-threaded connection between the socket and nipple, whereby as the initially combined hose and socket and the nipple are rotated relatively to each other the end portion of the hose tends to be extruded or displaced longitudinally into the annular space formed between the socket and the nipple, with the result that this space is completely filled by the material of the hose, which is thus gripped tightly and firmly between the socket and the nipple.

The invention has for its object to provide a superior and highly efficient joint between the hose and the end fitting to that previously made possible by the normally employed construction of end fitting and which is capable of being employed with particular advantage in connection with the securing to an end fitting of the kind described of a hose composed of rubber or rubber composition having an inner metal reinforcement normally constituted by wire braid embedded within the rubber to extend spirally longitudinally of the latter. Such reinforced hose is employed for high pressure duty and is known in the trade as "wire braided hose."

In connection with such wire braided hose and the end socket-nipple fittings therefor, it is advantageous, in order that the required endwise extrusions or displacement action may take place when the nipple is screwed into the socket, that the metal of the reinforcement should be exposed to the opposite and usually left-handed screw-threading on the interior surface of the socket, whereby an efficient gripping action may be maintained upon the hose but at the same time this gives rise to the necessity of providing a fluid-tight joint at the open end of the socket in order that moisture may be precluded from gaining access to the metal of the reinforcement.

The invention provides an end fitting which satisfactorily fulfills these requirements and enables an efficient and highly advantageous joint to be made between the hose and its end fitting.

In the accompanying drawing,

Fig. I is a longitudinal section through one construction of hose fitting in accordance with the invention, with a piece of hose secured thereto, and Fig. II is a fragmentary plan view of the flexible hose, with its end portion stripped down to the metal braid ready for securing to the metal end fitting.

Referring to the drawing, there is shown therein a metal end fitting consisting of an inner nipple 1 and an outer concentric socket 2 which is secured to the nipple by screw-threading 3 and forms with the nipple an annular elongated space 4 in which the end portion 5 of a length of flexible hose 6 is secured by the said hose end portion being gripped between an outer tapered surface 7 of the nipple, and the threaded interior 8 of the socket, the flexible hose consisting of rubber or rubber composition or like flexible material having a metal reinforcement embedded therein and consisting of an inner concentric layer 9 of metal or wire braid.

The threadings 3 and 8 are opposite hand and the threading 8 is preferably coarse as shown. Usually, the threading 3 is right hand and the threading 8 is left hand and the construction and arrangement is such that in the operation of securing the hose upon the end fitting by rotating the nipple and socket relatively to each other, the end portion 5 of the hose, which is previously stripped of its outer rubber or like covering 10 down to the interior metal reinforcement 9, is extruded or displaced axially into the annular space 4 and at the same time the threading 8 of the outer socket bites into the metal 9 of the hose so that the two become firmly united with each other. The socket threading 8 extends a distance corresponding to the length of the stripped end portion of the hose, as seen in Figure II, and has its root diameter located on a diameter which approximates the external diameter of this stripped hose end portion.

Advantage is taken of this endwise displacement of the hose into the annular space 4 of the hose fitting to enable an efficient fluid-tight joint to be secured between the hose and the fitting such that, in particular, water or moisture is precluded from entering into contact with the metal 9 and setting-up a state of corrosion, which might deleteriously effect the joint between the end portion of the hose and the metal end fitting.

To this end, the open end of the socket 2, on its interior surface, is of smooth and stepped formation and provides an inwardly directed wall 11 which is bevelled or tapered at an acute angle, as shown in Fig. I, to provide between it, and the other and preferably cylindrical surface 12 of the step, an annular enlarged space 15, the outer periphery of which is of angular shape and in which space the end portion of the hose containing the end edge 16 (Fig. II) of the outer rubber, or rubber-like hose covering, is confined with the said end edge maintained in firm seating engagement with the wall 11 due to the axial displacement of the hose towards the closed end of the annular space 4 as, and for the reason above mentioned. The construction is such as provides a cylindrical extension 13 of the socket, which extension overlies the outer rubber covering of the unstripped part of the flexible hose immediately adjacent the stripped end portion of the hose and thereby prevents this portion of the hose from springing outwardly away from the inclined wall 11 of the socket. This cylindrical extension 13 of the socket lies opposite an extension 14 of the corresponding end of the nipple, which socket and nipple extensions combine to form the enlarged annular space 15 referred to and provide for the confining of the unstripped end portion of the hose, immediately adjacent said stripped end portion, in position such that the required fluid-tight joint is made and which prevents the intrusion of liquid or moisture from the outside of the hose to the wire braid 9, or the like.

The outer surface of the end extension 14 of the nipple may be tapered continuously with the remainder and tapered exterior surface of the nipple or, as shown in Figure I, the nipple extension may be of cylindrical form. Also, other detail changes may be made without departing from the scope of the invention as claimed.

I claim:

In a fitting for reinforced hose having exterior and interior layers of impervious resilient material separated by a layer of reinforcing material bared for a predetermined distance from the end to be coupled, said fitting comprising a socket of permanently fixed size having a chamber open at one end and the other end of said chamber comprising a wall having a threaded aperture therethrough, means providing a seal between the fitting and the bared hose comprising a plurality of axially spaced inwardly facing ridges on the socket interior, and a nipple comprising a threaded base engageable with said threaded aperture, a cylindrical extension of said threaded base extending beyond the latter and merging into a gradually tapered wall portion adjoining said extension and forming an outwardly diverging acute angle with a line through said ridges, and means providing a seal between the end of the unstripped hose, said last mentioned sealing means comprising a smooth walled counter-bore at the corresponding socket end and said counter-bore having a tapered inner end mating with a taper end on the unstripped hose portion, whereby the screwing-on of the nipple tends to draw the said tapered hose end into sealing engagement with the tapered end of said counter-bore.

BENJAMIN A. MAIN, JR.

REFERENCES CITED

The following references are of record in the file of this patent:

UNITED STATES PATENTS

| Number | Name | Date |
| --- | --- | --- |
| 633,324 | Luke | Sept. 19, 1899 |
| 2,077,864 | Tompkins | Apr. 20, 1937 |
| 2,288,684 | Couty | July 7, 1942 |
| 2,333,350 | Weatherhead | Nov. 2, 1943 |
| 2,441,718 | Parker | May 18, 1948 |